(12) United States Patent
Kadam et al.

(10) Patent No.: US 10,483,679 B1
(45) Date of Patent: Nov. 19, 2019

(54) COMBINATION RECEPTACLE

(71) Applicant: EATON INTELLIGENT POWER LIMITED, Dublin (IE)

(72) Inventors: Nilesh Ankush Kadam, Pune (IN); Sushant Dilip Raut, Pune (IN); Saivaraprasad Murahari, Peachtree City, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/014,729

(22) Filed: Jun. 21, 2018

(51) Int. Cl.
*H01R 13/447* (2006.01)
*H01R 13/66* (2006.01)
*H01R 25/00* (2006.01)
*H01R 27/02* (2006.01)

(52) U.S. Cl.
CPC ....... *H01R 13/447* (2013.01); *H01R 13/6675* (2013.01); *H01R 13/6683* (2013.01); *H01R 25/006* (2013.01); *H01R 27/02* (2013.01); *G06F 2213/0042* (2013.01)

(58) Field of Classification Search
CPC .................................................. H01R 13/447
See application file for complete search history.

(56) References Cited

U.S. PATENT DOCUMENTS

| | | | |
|---|---|---|---|
| 8,758,031 B2 * | 6/2014 | Cheng | H05K 5/02 439/107 |
| 2004/0147148 A1 | 7/2004 | Ng et al. | |
| 2006/0014441 A1 | 1/2006 | Sato et al. | |
| 2009/0280664 A1 | 11/2009 | Francis et al. | |
| 2010/0210125 A1 | 8/2010 | Wu | |
| 2011/0244699 A1 * | 10/2011 | Bernstein | A61B 5/14532 439/135 |
| 2013/0280956 A1 | 10/2013 | Cheng et al. | |
| 2016/0149354 A1 | 5/2016 | Mortun et al. | |
| 2017/0063008 A1 | 3/2017 | Goyal et al. | |
| 2017/0141608 A1 | 5/2017 | Stenger et al. | |
| 2017/0222378 A1 * | 8/2017 | Netsu | H01R 13/447 |
| 2017/0331218 A1 * | 11/2017 | Chang | H01R 13/514 |
| 2018/0341309 A1 * | 11/2018 | Sporck | G06F 1/266 |

OTHER PUBLICATIONS

European Patent Office, "International Search Report and Written Opinion" for corresponding PCT/EP2019/025178, 22 pp., dated Sep. 6, 2019.

* cited by examiner

*Primary Examiner* — Ross N Gushi
(74) *Attorney, Agent, or Firm* — Eckert Seamans Cherin & Mellott, LLC (57) ABSTRACT

A combination receptacle includes a first universal serial bus (USB) port having a first type, a second USB port having a second type, a shutter structured to have a first state to allow access to the first USB port and block access to the second USB port and a second state to block access to the first USB port and allow access to the second USB port, and circuitry structured to control and provide power to the first and second USB ports.

21 Claims, 11 Drawing Sheets

COMBINATION RECEPTACLE

BACKGROUND

Field

The disclosed concept relates generally to receptacles, and in particular, to receptacles for providing a combination of types of power.

Background Information

Electricity is often provided to electric devices via an electrical receptacle in the wall or floor of a room. Electrical receptacles are usually duplex-type electrical receptacles that include two sockets coupled together with a common housing. Each socket is able to electrically connect to and provide power to one power cord.

Some types of receptacle have replaced one of their sockets with one or more universal serial bus (USB) ports. The receptacle will include circuitry to convert utility power to that which is usable by the USB ports. The receptacle also needs to include a controller to control operation of the USB ports. The USB ports can be used to charge a variety of electronic devices such as phones and tablets.

Over the years, several different types of USB ports have been defined in USB specifications. A receptacle including a USB port will typically only include one type of USB port. However, as technology advances and the USB specifications add new types and options within types of USB ports, a receptacle with a single type of USB port may not be satisfactory for a customer.

There is room for improvement in combination receptacles.

SUMMARY

These needs and others are met by embodiments of the disclosed concept in which a combination receptacle includes different types of USB ports. These needs and others are also met by embodiments of the disclosed concept in which a combination receptacle changes power provided to USB ports based on temperature.

In accordance with one aspect of the disclosed concept, a combination receptacle comprises: a first USB port having a first type; a second USB port having a second type; a shutter structured to have a first state to allow access to the first USB port and block access to the second USB port and a second state to block access to the first USB port and allow access to the second USB port; and circuitry structured to control and provide power to the first and second USB ports.

In accordance with another aspect of the disclosed concept, a combination receptacle comprises: a first USB port; a second USB port; circuitry structured to control and provide power to the first and second USB ports; and a temperature sensor structured to sense temperature in the receptacle, wherein the circuitry is structured to provide a first amount of the power to the first and second USB ports when the temperature sensed by the temperature sensor is below a predetermined threshold temperature and to provide a second amount of power to the first and second USB ports when the temperature sensed by the temperature sensor is at or above the predetermined threshold temperature, and wherein the second amount of power is less than the first amount of power.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein. As employed herein, the statement that two or more parts are "coupled" together shall mean that the parts are joined together either directly or joined through one or more intermediate parts.

One popular type of USB port is a USB Type-C port. The USB specifications also include a USB Power Delivery (PD) specifications that set forth charging capabilities. A USB Type-C port may or may not be compliant with the USB PD specification. A USB Type-C port compliant with the USB PD specification will be capable of charging at various voltages and at current up to 5 A, while a USB Type-C port that is not compliant with the USB PD specification charges at 5V and currents of up to 1.5 A or 3 A. For purposes of this application, a USB Type-C port that is compliant with the USB PD specification will be referred to as a USB Type-C PD port and a USB Type-C port that is not compliant with the USB PD specification will be referred to as a USB Type-C non-PD port.

Demand for USB Type-C PD ports increases as the use of different types of electronics devices with different charging requirements increases. Also, USB Type-C PD ports can provide faster charging than USB Type-C non-PD ports. However, providing power through multiple USB Type-C PD ports or a USB Type-C PD port and another type of USB port simultaneously increase the power capacity needed from the receptacle including the USB ports. The increased power capacity would require a more costly power supply. Additionally, the increased power capacity would increase heat generation that could be difficult to address in the receptacle. Example embodiments of the disclosed concept address these issues. For example, in some example embodiments, a shutter is provided that limits access to either one USB PD port or two USB non-PD ports. In some other example embodiments, power provided to USB ports is reduced based on a sensed temperature in the receptacle.

Figure 1:
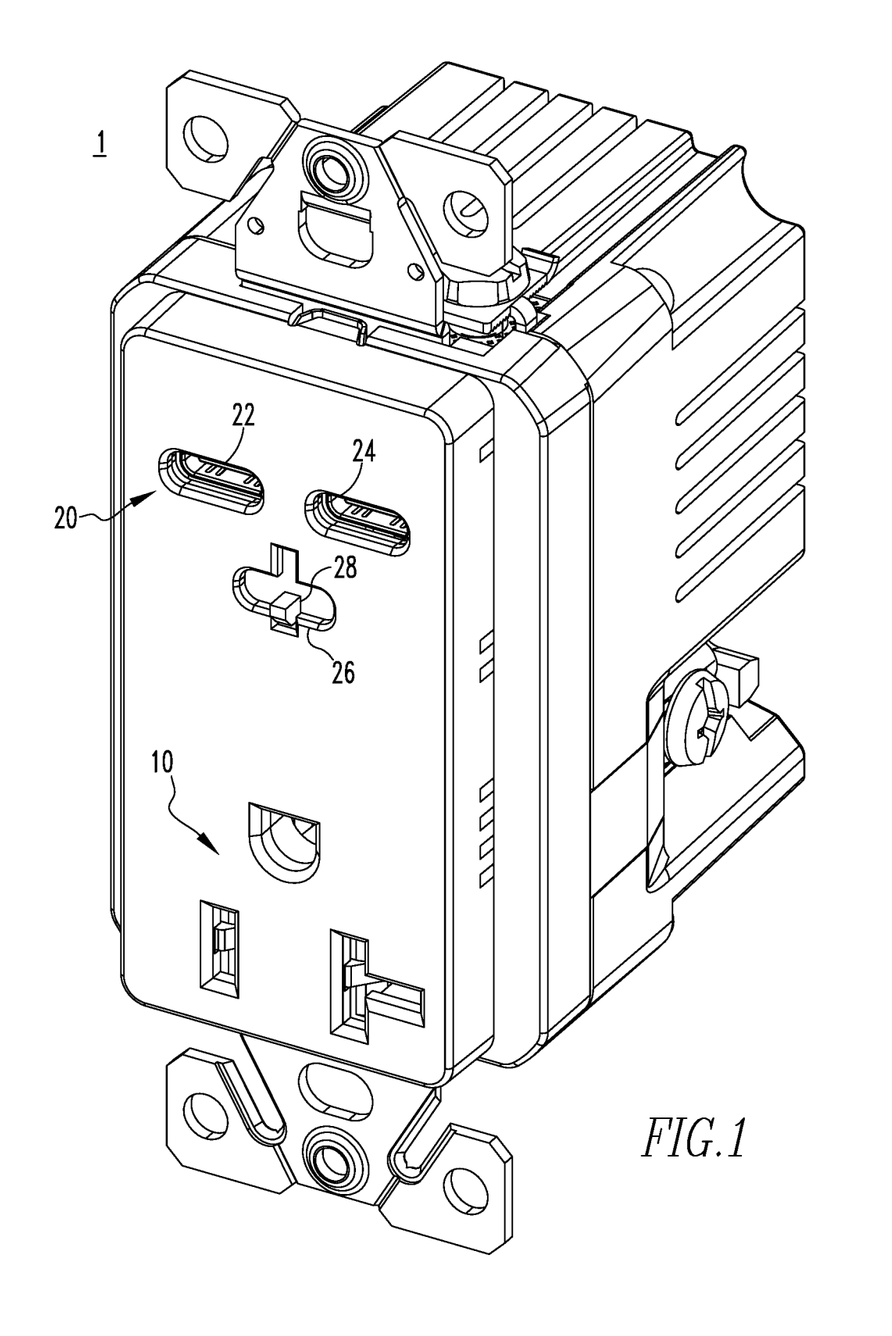
FIG. 1 is an external view of a receptacle in accordance with an example embodiment of the disclosed concept.

FIG. 1 is an external view of a combination receptacle 1 in accordance with an example embodiment of the disclosed concept. The receptacle 1 includes a traditional power socket 10 that is structured to receive a plug and provide utility power (e.g., 120Vac) through the plug.

The receptacle also includes a USB connection area 20 on its front face. The USB connection area 20 includes three USB ports 22,24,26. In some example embodiments, the USB ports 22,24,26 are structured to receive USB Type-C connectors. However, it will be appreciated by those having ordinary skill in the art that the USB ports 22,24,26 may modified or replaced to receive other types of USB connectors without departing from the scope of the disclosed concept.

In some example embodiments of the disclosed concept, the USB ports 22,24,26 are arranged in a triangular pattern. Two of the USB ports 22,24 are aligned with each other along a horizontal axis. The third USB port 26 is vertically offset from the other two USB ports 22,24 which creates a triangular shape between the three USB ports 22,24,26. However, it will be appreciated by those having ordinary skill in the art that other types of arrangements of the USB ports 22,24,26 may be employed without departing from the scope of the disclosed concept.

The USB connection area 20 also includes a shutter 28. In the view shown in FIG. 1, the shutter 28 is blocking one of the USB ports 26. The shutter 28 is configured to be slid open by a user to access the USB port 26. When the shutter 28 is slid open to access the USB port 26, the shutter 28 slides upward and blocks the other USB ports 22,24. Thus, the shutter 28 has a first state where the USB ports 22,24 are accessible and the USB port 26 is blocked and a second state where the USB ports 22,24 are blocked and the USB port 26 is accessible.

Figure 2A:
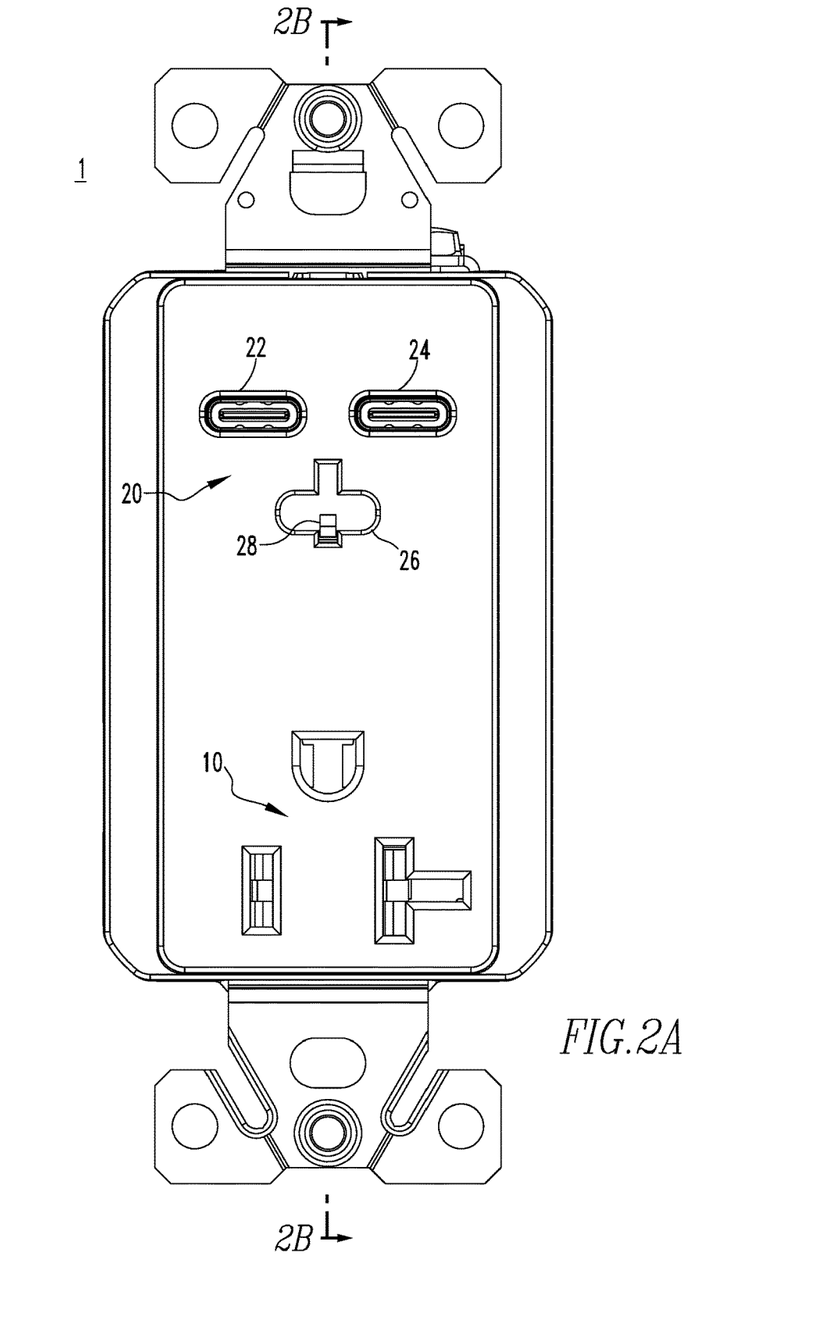
FIG. 2A is a plan view of the receptacle of FIG. 1 in accordance with an example embodiment of the disclosed concept.
Figure 2B:
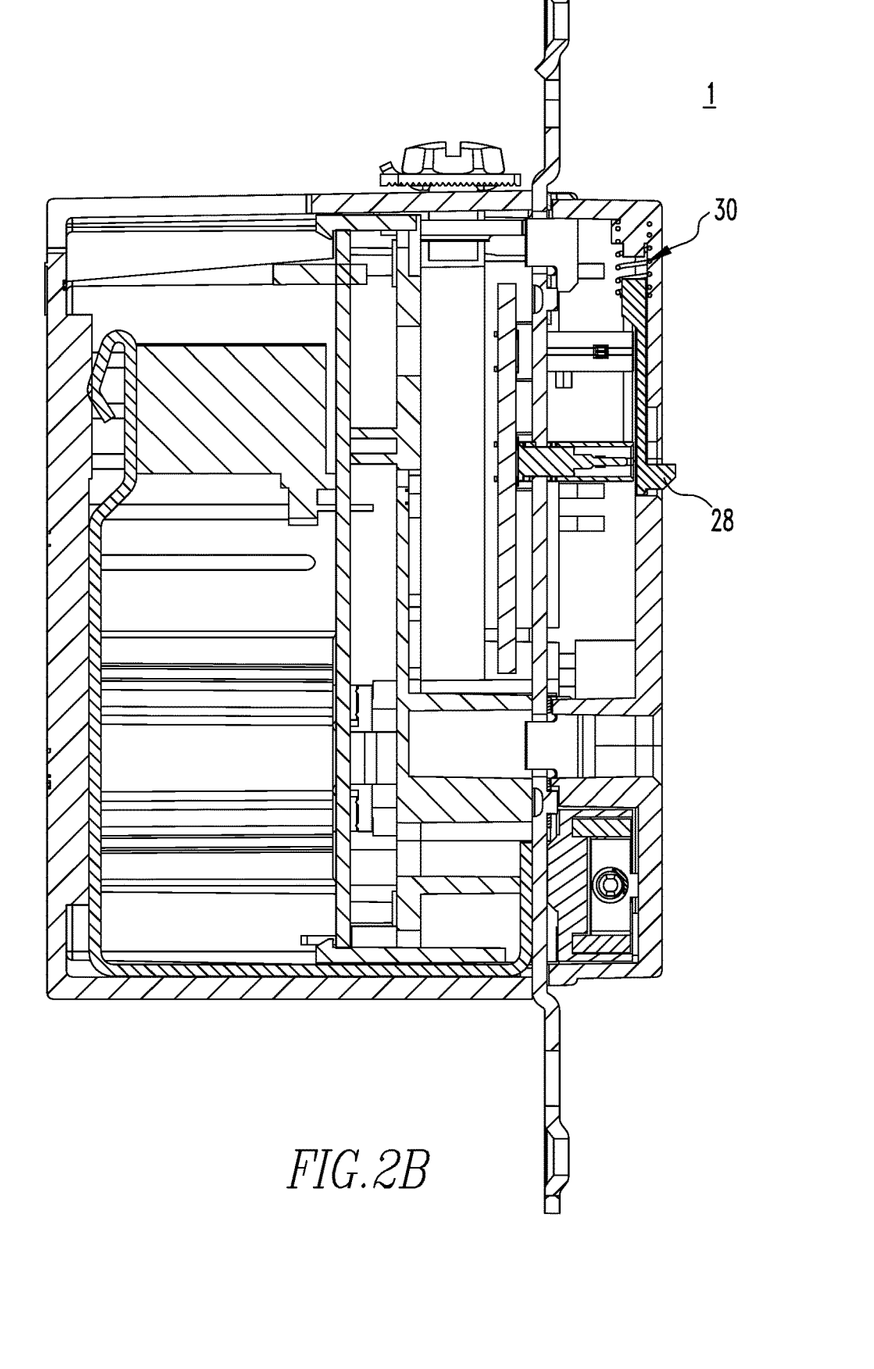
FIG. 2B is a section view of the receptacle of FIG. 2A in accordance with an example embodiment of the disclosed concept.

FIG. 2A is a plan view of the receptacle 1 of FIG. 1 and FIG. 2B is a sectional view of the receptacle 1. As shown in FIG. 2B, the shutter 28 includes a protrusion that the user may interact with to slide the shutter 28 to access the USB port 26. The shutter 28 includes a planar portion disposed behind the front face of the receptacle which allows it to block the USB ports 22,24 when it has been slid to access the USB port 26.

The receptacle 1 also includes a spring 30 that applies a bias force against the shutter 28. The spring 30 is configured to apply the bias force against the shutter 28 to bias the shutter towards its first state where it allows access to the USB ports 22,24 and allows access to the USB port 26. That is, if a user slides the shutter 28 to access the USB port 26 and then lets go of the shutter 28, the spring 30 will cause the shutter 28 to slide and block the USB port 26. However, if the user inserts a USB connector into the USB port 26, the USB connector will prevent the shutter 28 from sliding to block access to the USB port 26.

Figure 3A:
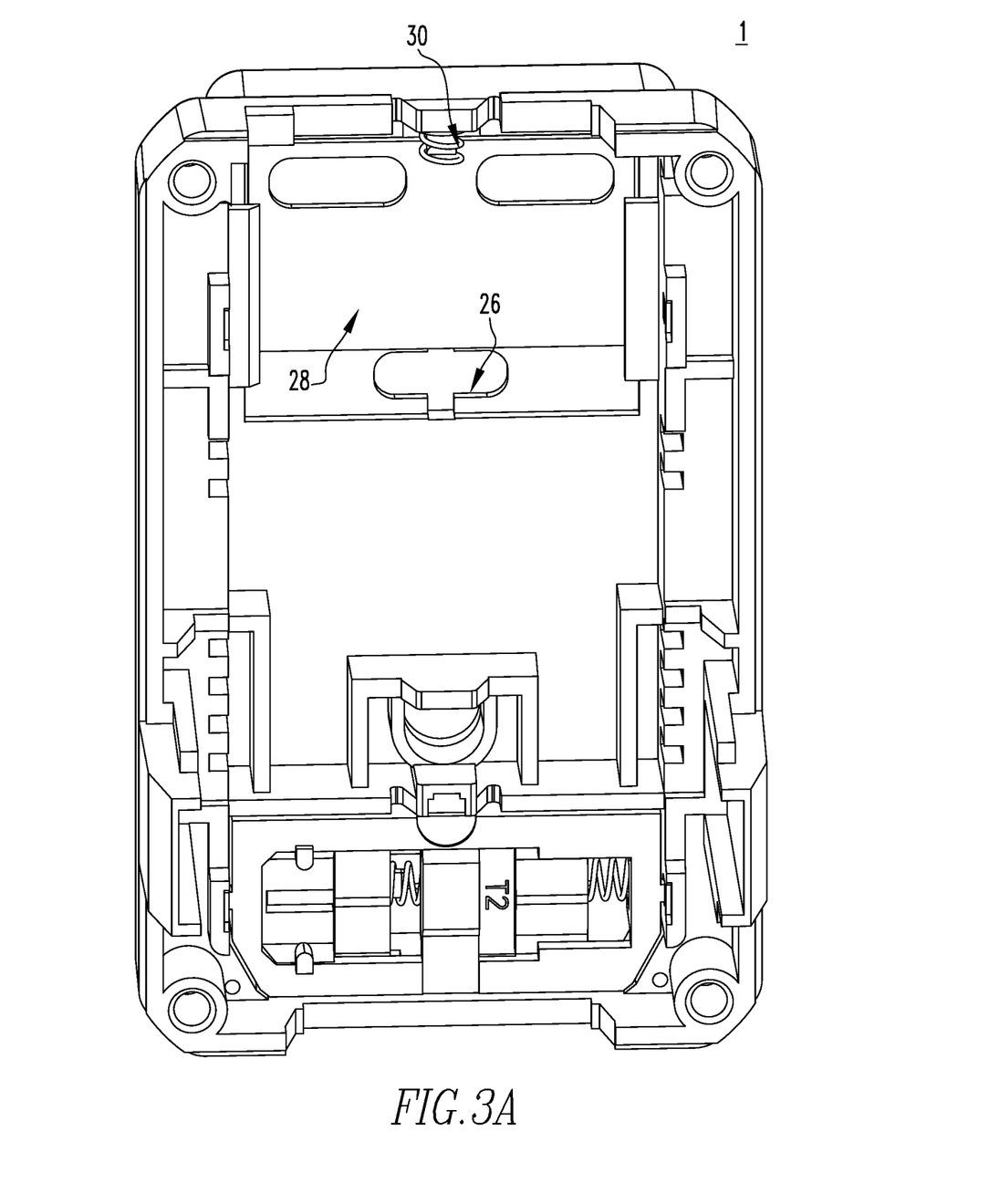
FIGS. 3A and 3B are rear views of the front face of the receptacle of FIG. 1 in accordance with an example embodiment of the disclosed concept.
Figure 3B:
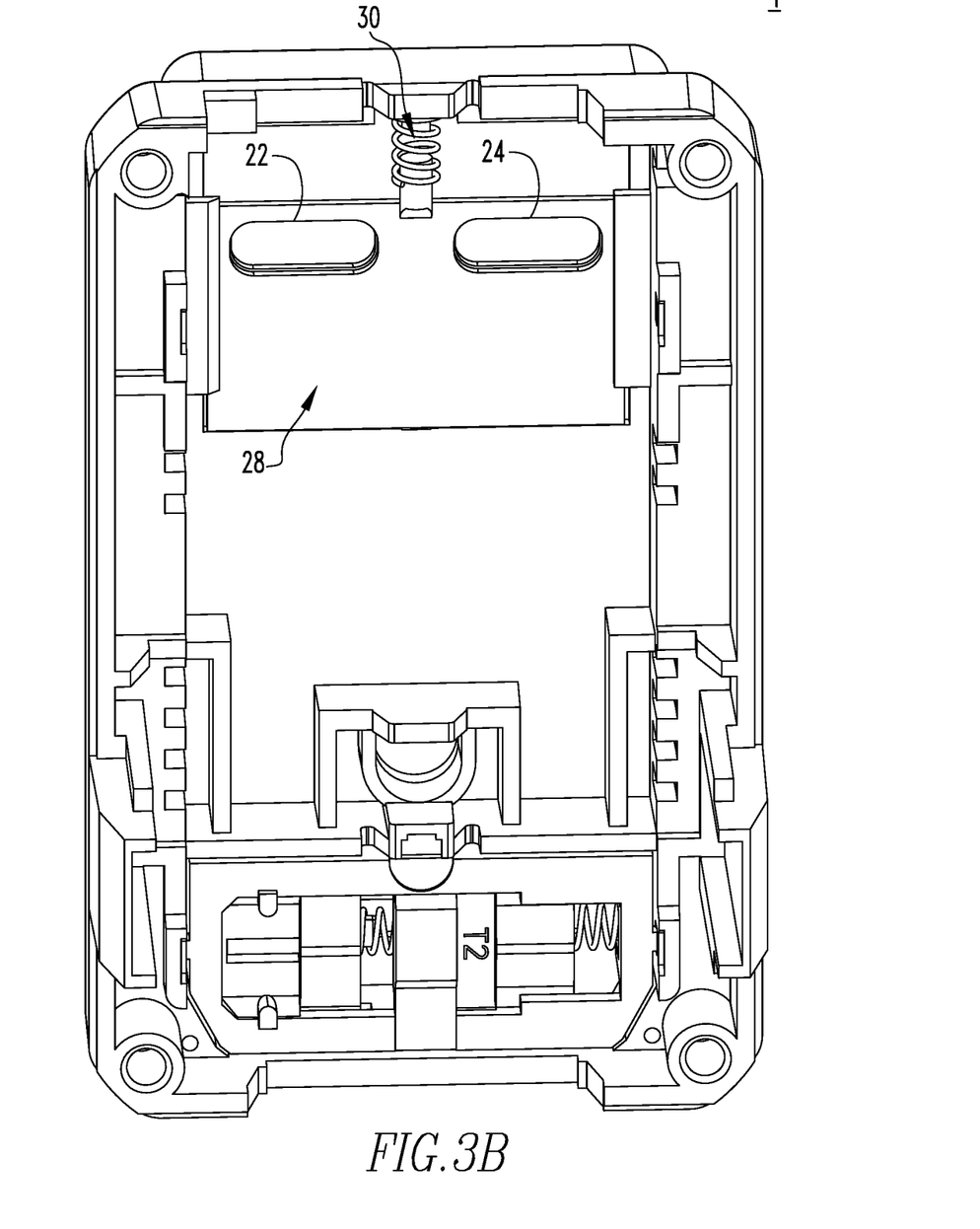

FIGS. 3A and 3B are rear views of the front face of the receptacle 1 of FIG. 1. FIGS. 3A and 3B illustrate operation of the shutter 28. In FIG. 3A, the shutter 28 has been slid upward such that access is provided to the USB port 26. The spring 30 biases the shutter 30 such that it attempts to slide to block the USB port 26. In FIG. 3B, the bias of the spring 30 has been allowed to slide the shutter 28 such that it blocks access to the USB port 26 and allows access to the USB ports 22 and 24.

In some example embodiments of the disclosed concept, the USB ports 22,24,26 provide different USB connections. For example and without limitation, in some example embodiments of the disclosed concept, the USB ports 22,24 are USB Type-C Non-PD ports and the USB port 26 is a USB Type-C PD port.

Figure 4:
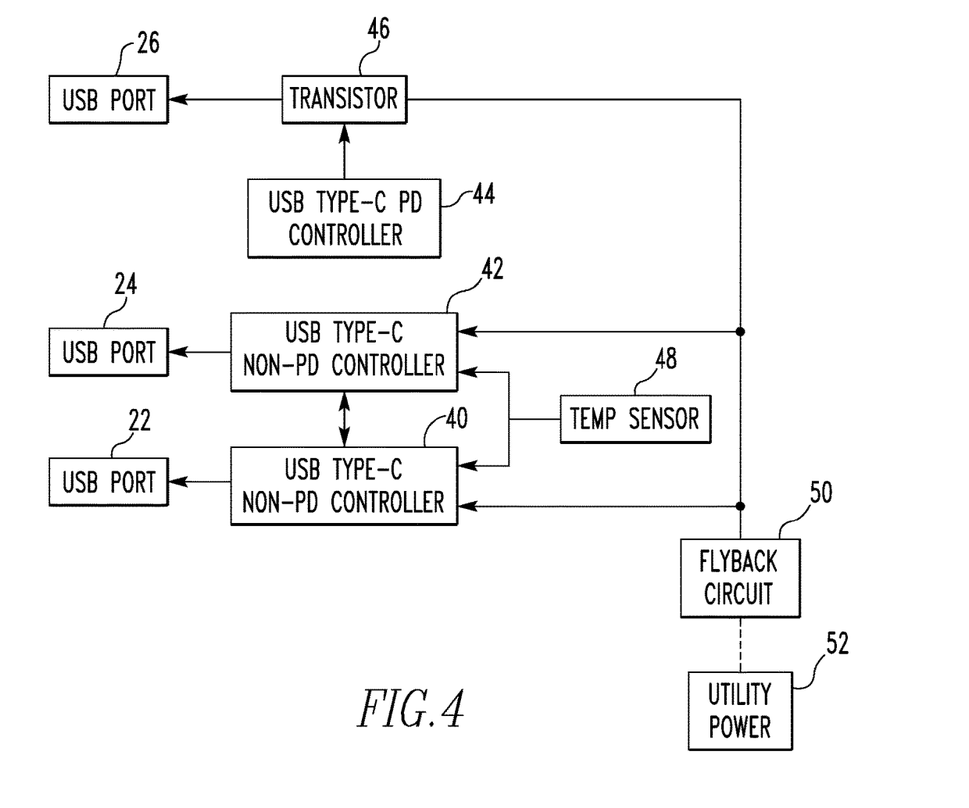
FIG. 4 is a schematic diagram of circuitry for controlling the USB ports of a receptacle in accordance with an example embodiment of the disclosed concept.

FIG. 4 is a schematic diagram of circuitry for controlling the USB ports in the receptacle 1 of FIG. 1 in accordance with an example embodiment of the disclosed concept. As shown in FIG. 4, there are three USB ports 22,24,26. The USB ports 22,24,26 may configured to receive a USB Type-C connector, as is shown in FIG. 1. In the example embodiment shown in FIG. 3, the USB ports 22,24 are USB Type-C Non-PD ports and the USB port 26 is a USB Type-C PD port.

A transistor 46 is coupled to the USB port 26 and a USB Type-C PD controller 44 is coupled to the transistor 46. In some example embodiments, the transistor may be a MOSFET. However, it will be appreciated by those having ordinary skill in the art that other types of transistors may be employed without departing from the scope of the disclosed concept. The transistor 46 is coupled between a flyback circuit 50 and the USB port 26. The flyback circuit 50 receives utility power 52 and converts it for use by the USB ports 22,24,26. For example and without limitation, the flyback circuit 50 may convert AC utility power 52 to DC power for use by the USB ports 22,24,26. In some example embodiments of the disclosed concept, the flyback circuit 50 is structured to provide up to 36 W of power for use by the USB ports 22,24,26. In some example embodiments of the disclosed concept, the flyback circuit 50 is structured to provide up to 45 W of power for use by the USB ports 22,24,26. While a flyback circuit 50 is shown in the present embodiment, it will be appreciated that the flyback circuit 50 is just one example of a power supply for converting AC utility power 52 to DC power for use by the USB ports 22,24,26. Other types of power supplies may be employed in place of or in addition to the flyback circuit 50 without departing from the scope of the disclosed concept.

The USB Type-C PD controller 44 is structured to provide for communication and power to the USB port 26 in compliance with the USB PD specifications. For example and without limitation, the USB Type-C PD controller 44 may be structured to provide a power profile including 5V, 9V, 12V, 15V, and 20V to the USB port 26 in compliance with the USB PD specifications. However, it will be appreciated by those having ordinary skill in the art that other power profiles may be employed without departing from the scope of the disclosed concept. A USB Type-C Non-PD port, on the other hand would only provide power at 5V. In some example embodiments, the USB Type-C PD controller provides for 36 W of power to the USB port 26. In some example embodiments, the USB Type-C PD controller provides for 45 W of power to the USB port 26. However, it will be appreciated by those having ordinary skill in the art that different amounts of power may be provided without departing from the scope of the disclosed concept.

USB Type-C Non-PD controllers 40,42 are coupled to the USB ports 22,24, respectively. The USB Type-C Non-PD controllers 40,42 provide for communication and power to the USB ports 22,24 that is not compliant with the USB PD specifications. For example and without limitation, the USB Type-C Non-PD controllers 40,42 provide power only at 5V to the USB ports 22,24, rather than a power profile containing multiple voltages. The USB Type-C Non-PD controllers 40,42 are coupled between the USB ports 22,24 and the flyback circuit 50. The USB Type-C Non-PD controllers 40,42 use power from the flyback circuit 50 to provide power to the USB ports 22,24.

A temperature sensor 48 is coupled to the USB Type-C Non-PD controllers 40,42. The temperature sensor 48 is structured to sense temperature within the receptacle 1. In some example embodiments, the temperature sensor 48 is structured to sense temperature proximate the circuitry associated with the USB ports 22,24,26 (e.g., without limitation, proximate a printed circuit board that contains the circuitry). The USB Type-C Non-PD controllers 40,42 are structured to operate based on the temperature sensed by the temperature sensor 48. In some example embodiments, the USB Type-C Non-PD controllers 40,42 operate in a first manner when the sensed temperature is below a threshold temperature and operate in a second manner when the sensed temperature is above the threshold temperature.

In some example embodiments, when the USB Type-C Non-PD controllers 40,42 operate in the first manner, they provide shared power to the USB ports 22,24 at a first level. For example and without limitation, the USB Type-C Non-PD controllers 40,42 provide a shared power of 30 W between the USB ports 22,24. For example, the USB Type-C Non-PD controllers 40,42 provide power at 5V and 3 A to each of the USB ports 22,24. When the sensed temperature exceeds the threshold level, the USB Type-C Non-PD controllers 40,42 switch to operating in the second manner. In some example embodiments, when the USB Type-C Non-PD controllers 40,42 operate in the second manner, they provide shared power to the USB ports 22,24 at a second level. In some example embodiments, the second level is lower than the first level. In some example embodiments, the second level may be about half of the first level. For example, the USB Type-C Non-PD controllers 40,42 may provide a shared power of 15 W to the USB ports 22,24. For example, the USB Type-C Non-PD controllers 40,42 may provide power at 5V and 1.5 A to each of the USB ports 22,24. By reducing the power provided based on the temperature sensed by the temperature sensor 48, overheating of the circuitry can be avoided.

In some example embodiments, the temperature sensor 48 may output a signal representing the sensed temperature to the USB Type-C Non-PD controllers 40,42 and the USB Type-C Non-PD controllers 40,42 may determine whether the sensed temperature has exceeded the threshold and whether they should change their manner of operation. In some other example embodiments, the temperature sensor 48 may determine whether the sensed temperature has exceeded the threshold and may output a signal to the USB Type-C Non-PD controllers 40,42 only when the sensed temperature exceeds the threshold. The USB Type-C Non-PD controllers 40,42 may change their manner of operation in response to receiving the signal from the temperature sensor 48.

Figure 5:
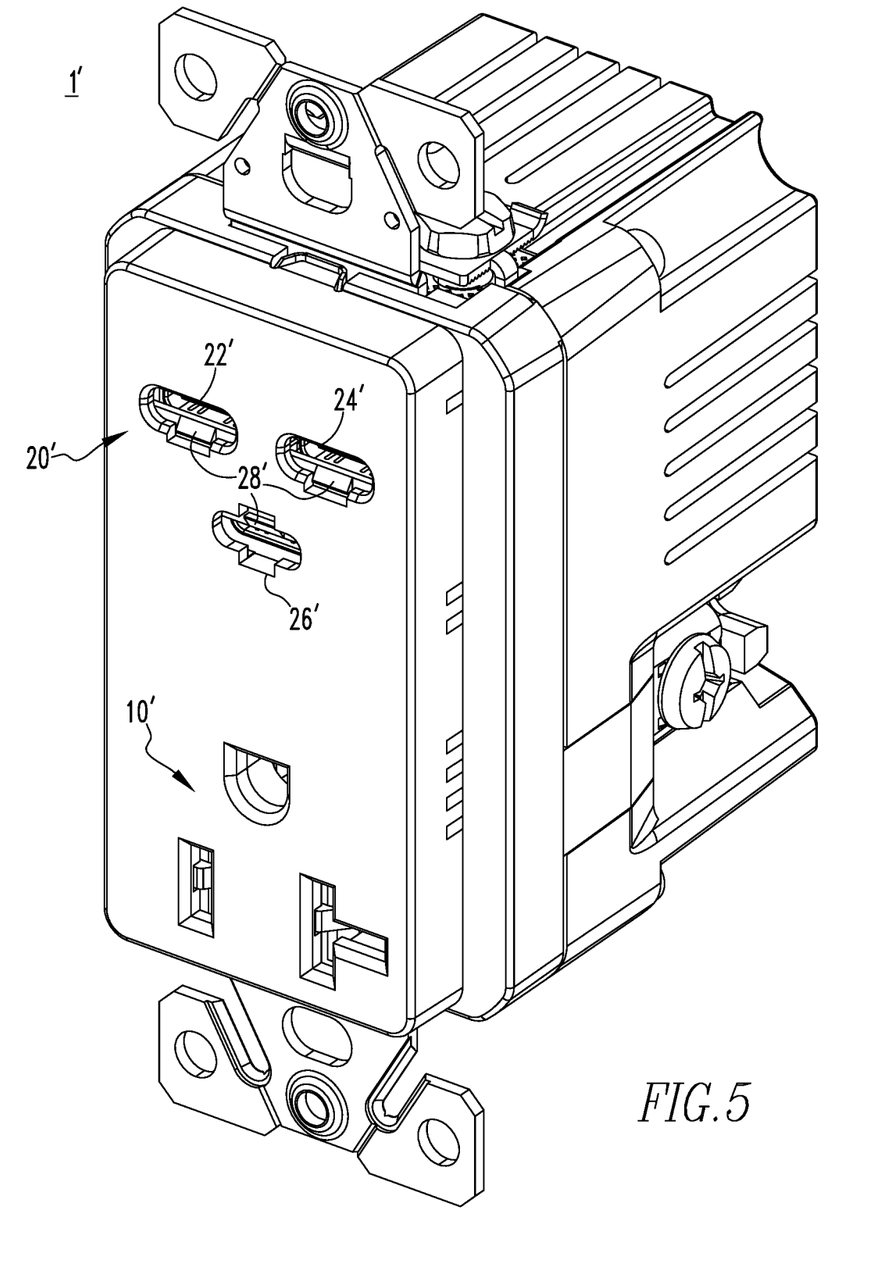
FIG. 5 is an external view of a receptacle in accordance with another example embodiment of the disclosed concept.

FIG. 5 is an external view of a receptacle 1' in accordance with another example embodiment of the disclosed concept. The receptacle 1' of FIG. 5 is similar to the receptacle 1' of FIG. 1. For example, the receptacle 1' of FIG. 5 includes a traditional power socket 10' to the traditional power socket 10 included in the receptacle 1 of FIG. 1. However, the receptacle 1' of FIG. 5 includes a different USB connection area 20' compared to the USB connection area 20 of FIG. 1.

The USB connection area 20' includes USB ports 22',24', 26' and a shutter 28'. The USB ports 22',24',26' are structured to receive USB Type-C connectors. However, it will be appreciated by those having ordinary skill in the art that the USB ports 22',24',26' may be modified or replaced to receive other types of USB connectors without departing from the scope of the disclosed concept.

Figure 6A:
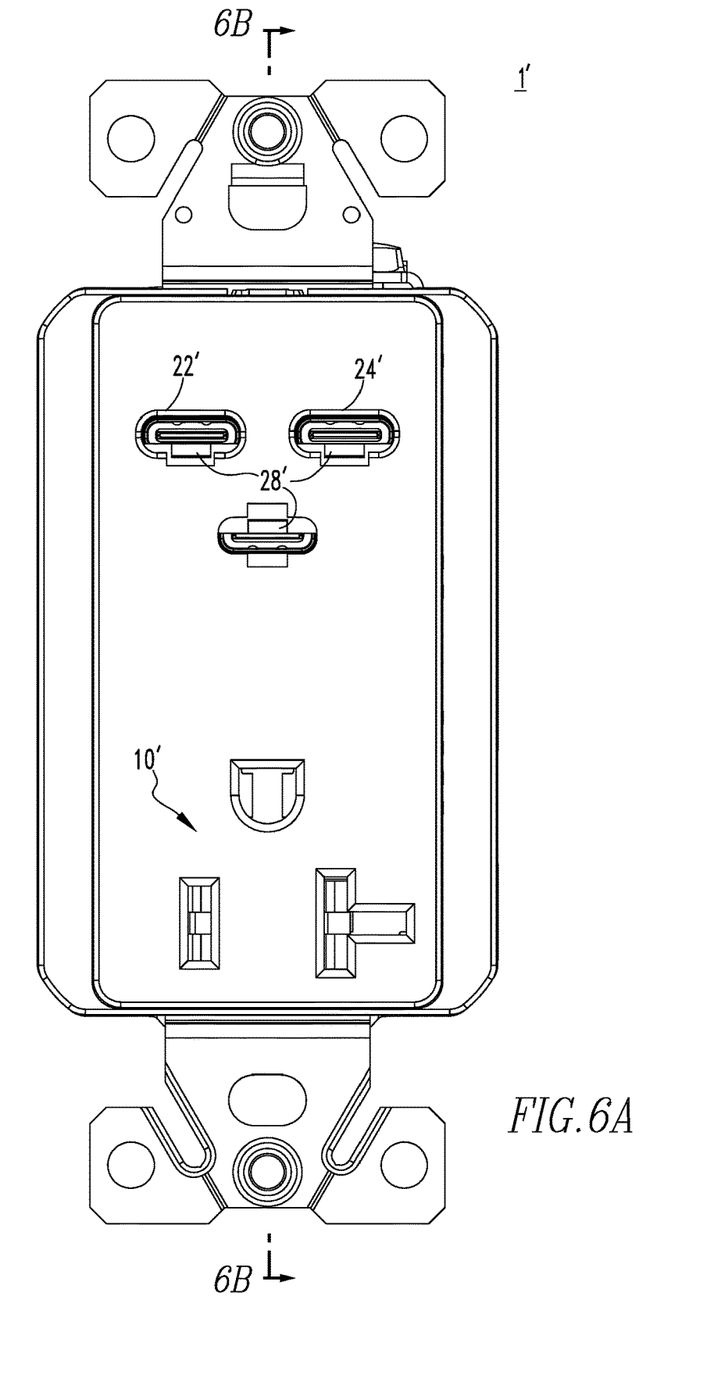
FIG. 6A is a plan view of the receptacle of FIG. 5 in accordance with an example embodiment of the disclosed concept.
Figure 6B:
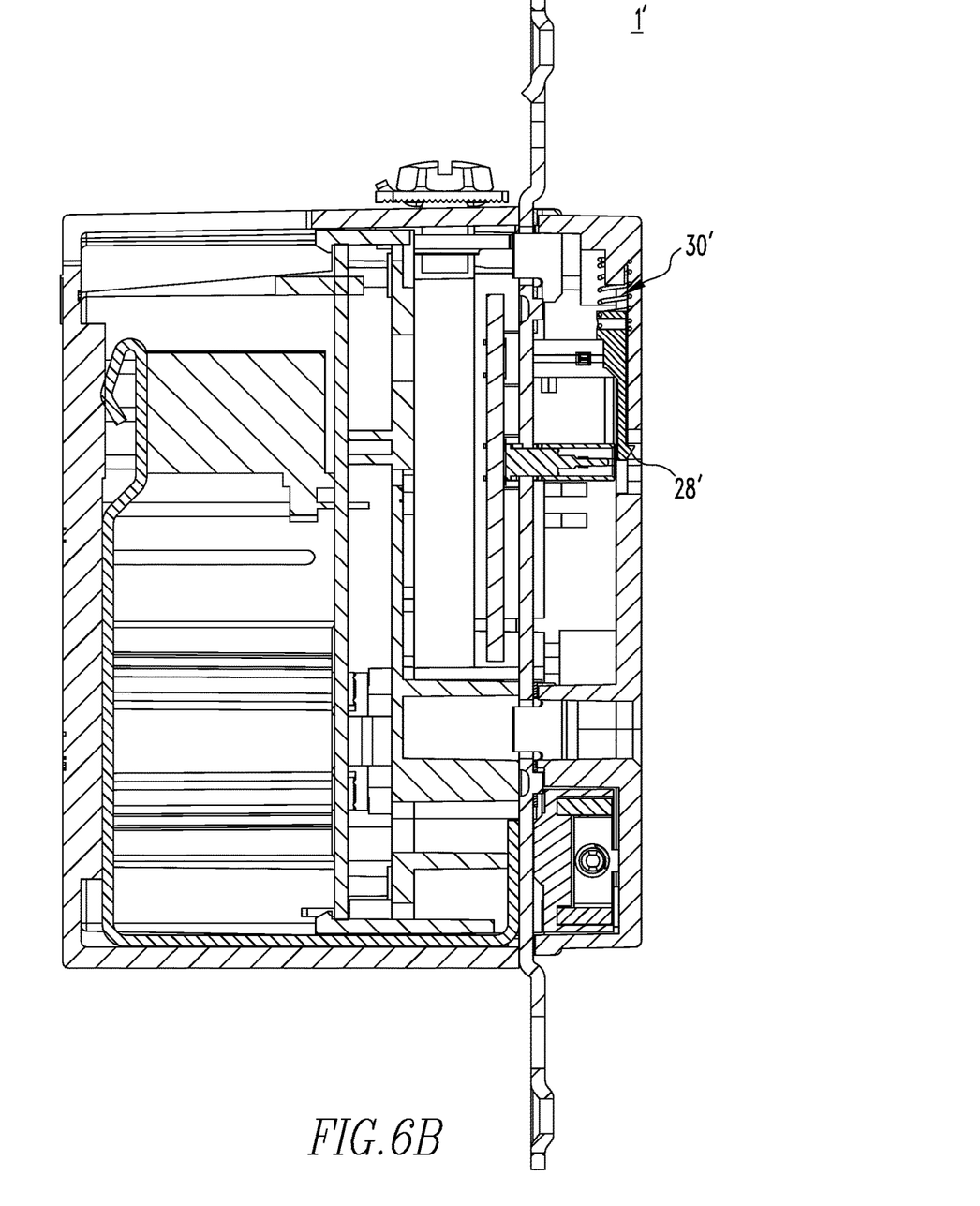
FIG. 6B is a sectional view of the receptacle of FIG. 6A in accordance with an example embodiment of the disclosed concept.

The shutter 28' is partially disposed behind the front face of the receptacle 1', as is shown in FIG. 6B. The shutter 38' includes three angled portions that extend into the openings of the USB ports 22',24',26', respectively. The angled portion extending into the USB port 26' is angled such that when a USB connector is inserted into the USB port 26', the USB connector abuts against the angled portion of the shutter 28' and presses the shutter 38' upward. In this manner, the shutter 28' moves upward and allows access to the USB port 26' while blocking the other USB ports 22',24'. Similarly, the angled portions extending into the USB ports 22',24' are angled such that when a USB connector is inserted into either of the USB ports 22',24', the USB connector abuts against the angled portion of the shutter 28' and presses the shutter 28' downward. In this manner, the shutter 28' moves downward and allows access to the USB ports 22,24' while blocking access to the other USB port 26'.

FIG. 6A is a plan view of the receptacle 1' of FIG. 5 and FIG. 6B is a sectional view of the receptacle 1'. As shown in FIG. 6B, the receptacle 1' also includes a spring 30'. The spring 30' is configured to apply a bias force against the shutter 28'. The bias force against the shutter 28' biases the shutter 28' towards a position where it blocks access to the USB port 26' and allows access to the USB ports 22',24'. Inserting a USB connector into the USB port 26' such that the USB connector abuts against the angled portion of the shutter 28' can overcome the bias force and cause the shutter 28' to slide upward and allow access to the USB port 26'.

The USB ports 22',24',26' in the receptacle 1' of FIG. 5 may be different types, similar to the receptacle of FIG. 1. For example, the USB ports 22',24' may be USB Type-C Non-PD ports and the USB port 26' may be a USB Type-C PD port. Additionally, the receptacle 1' of FIG. 5 may employ the circuitry shown in FIG. 4 without departing from the scope of the disclosed concept.

Figure 7A:
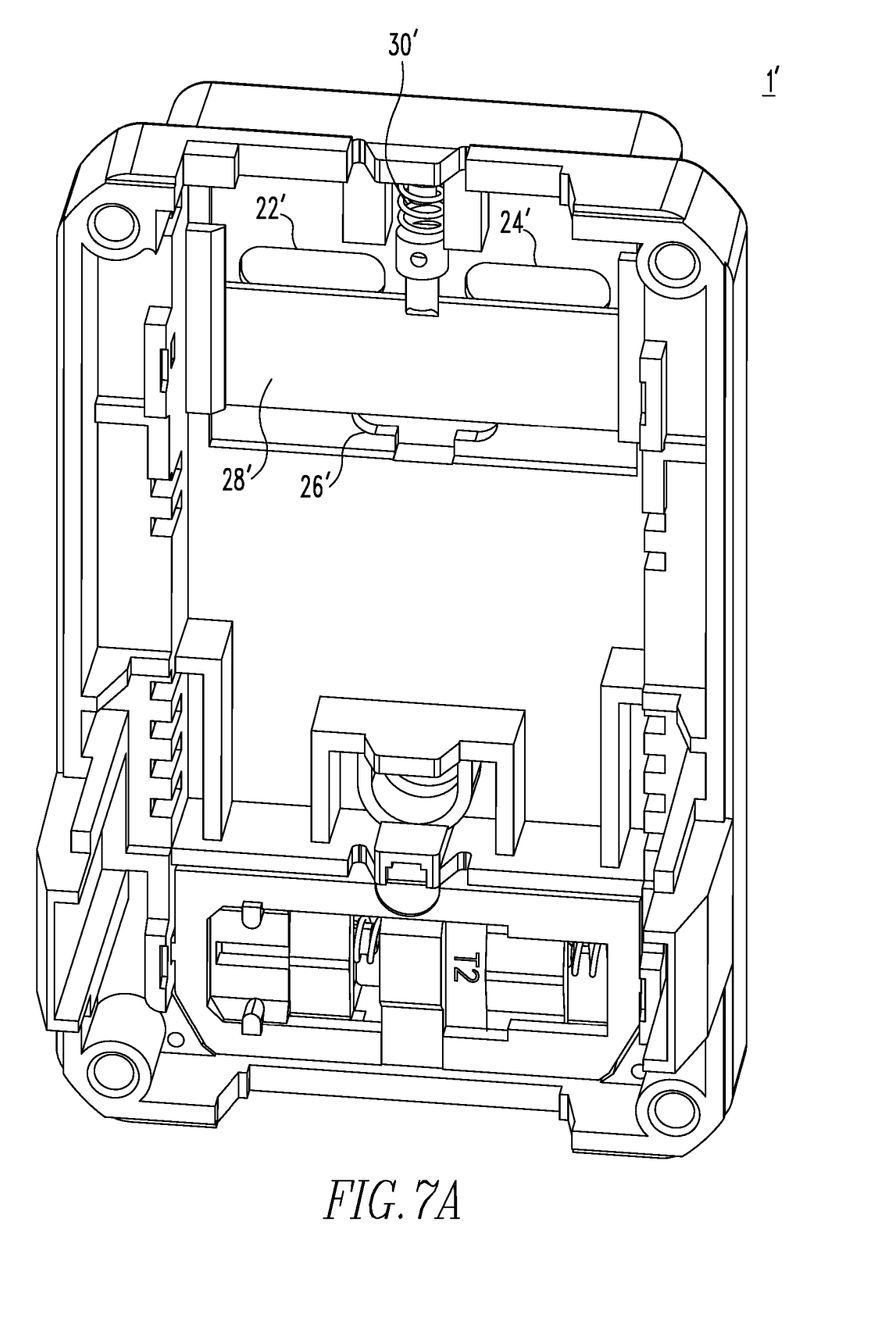
FIGS. 7A and 7B are rear views of the front face of the receptacle of FIG. 5 in accordance with an example embodiment of the disclosed concept.
Figure 7B:
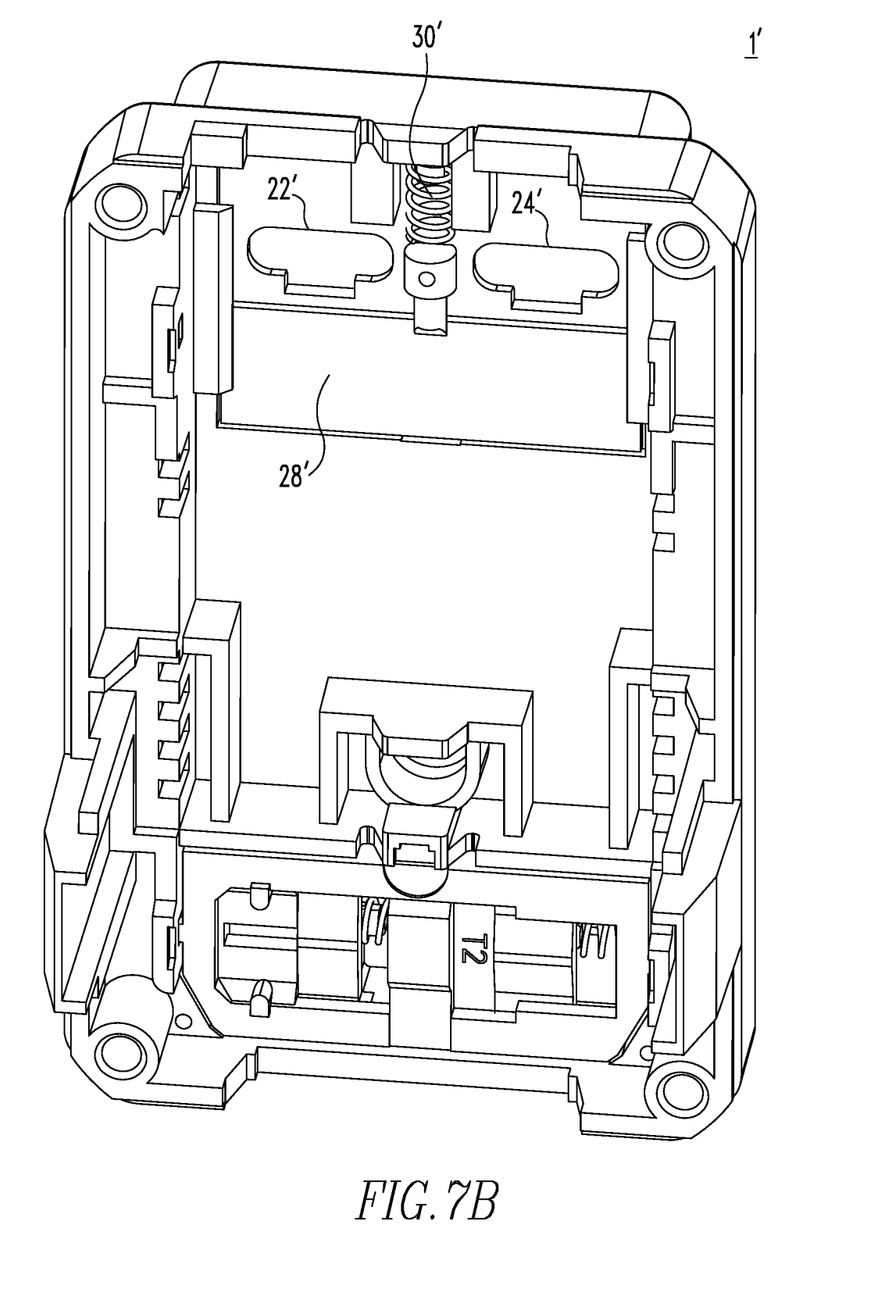

FIGS. 7A and 7B are rear views of the front face of the receptacle 1' of FIG. 5. FIGS. 7A and 7B illustrate operation of the shutter 28'. In FIG. 7A, the shutter 28' is in a middle position where a USB connector can be inserted into the USB port 26', which will push the shutter 28' upward and allow the USB connector to be inserted into the USB port 26'. In FIG. 7B, the shutter 28' has been slid downward so as to block access to the USB port 26' and to allow access to the USB ports 22' and 24'.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A combination receptacle comprising:
   a first universal serial bus (USB) port having a first type;
   a second USB port having a second type;
   a shutter structured to have a first state to allow access to the first USB port and block access to the second USB port and a second state to block access to the first USB port and allow access to the second USB port;
   circuitry structured to control and provide power to the first and second USB ports, wherein the first USB port is a USB Type-C power delivery (PD) port and the second USB port is a USB Type-C non-PD port, and wherein the circuitry is structured to provide a power profile including 5V, 9V, 12V, 15V, and 20V to the first USB port and to provide power at 5V to the second USB port.

2. The combination receptacle of claim 1, further comprising:

a third USB port, wherein the circuitry is structured to control and provide power to the third USB port, wherein the third USB port has the same type as the second USB port, wherein in the first state, the shutter is structured to allow access to the first USB port and to block access to the second and third USB ports, and wherein in the second state, the shutter is structured to block access to the first USB port and the allow access to the second and third USB ports.

3. The combination receptacle of claim 2, further comprising:

a temperature sensor structured to sense temperature in the receptacle, wherein the circuitry is structured to provide a first amount of the power to the second and third USB ports when the temperature sensed by the temperature sensor is below a predetermined threshold temperature and to provide a second amount of power to the second and third USB ports when the temperature sensed by the temperature sensor is at or above the predetermined threshold temperature, and wherein the second amount of power is less than the first amount of power.

4. The combination receptacle of claim 3, wherein the second amount of power is approximately 50% of the first amount of power.

5. The combination receptacle of claim 1, wherein the circuitry includes a power supply structured to convert utility power for use by the first and second USB ports.

6. The combination receptacle of claim 5, wherein the power supply includes a flyback circuit.

7. The combination receptacle of claim 1, further comprising:

a spring structured to bias the shutter toward the first state.

8. The combination receptacle of claim 1, wherein the shutter includes a protrusion operable by a user to slide the shutter from the first state to the second state.

9. The combination receptacle of claim 1, wherein the shutter includes a first angled portion extending into the first USB port and a second angled portion extending into the second USB port, wherein the first angled portion is structured to abut against a USB connector inserted into the first USB port and cause the shutter to slide from the second state to the first state, and wherein the second angled portion is structured to abut against the USB connector inserted into the second USB port and cause the shutter to slide from the first state to the second state.

10. The combination receptacle of claim 1, wherein the shutter is structured such that when the shutter is in the first state and a USB connector is inserted into the first USB port, the shutter cannot move to the second state until the USB connector is removed from the first USB port.

11. The combination receptacle of claim 1, further comprising:

a power socket structured to receive a plug, wherein the receptacle is structured to receive utility power and provide utility power to the power socket.

12. A combination receptacle comprising:

a first USB port;

a second USB port;

a third USB port;

a shutter structured to have a first state to allow access to the first USB port and block access to the second and third USB ports and a second state to block access to the first USB port and allow access to the second and third USB ports;

circuitry structured to control and provide power to the first, second, and third USB ports, and wherein the first USB port is a PD port and the second USB port is a USB non-PD port, wherein the third USB port has the same type as the second USB port, wherein the circuitry is structured to provide up to a maximum of 45 W of power to the first USB port and to provide up to a maximum of 30 W of power shared between the second and third USB ports.

13. A combination receptacle comprising:

a first USB port having a first type;

a second USB port having a second type;

a shutter structured to have a first state to allow access to the first USB port and block access to the second USB port and a second state to block access to the first USB port and allow access to the second USB port;

circuitry structured to control and provide power to the first and second USB ports, and wherein the circuitry includes a power supply structured to convert utility power for use by the first and second USB ports, and wherein the power supply is structured to provide up to 45 W of power for use by the first and second USB ports.

14. A combination receptacle comprising:

a first USB port;

a second USB port;

circuitry structured to control and provide power to the first and second USB ports; and a temperature sensor structured to sense temperature in the receptacle, wherein the circuitry is structured to provide a first amount of the power to the first and second USB ports when the temperature sensed by the temperature sensor is below a predetermined threshold temperature and to provide a second amount of power to the first and second USB ports when the temperature sensed by the temperature sensor is at or above the predetermined threshold temperature, and wherein the second amount of power is less than the first amount of power.

15. The combination receptacle of claim 14, wherein the second amount of power is approximately 50% of the first amount of power.

16. The combination receptacle of claim 14, wherein the first amount of power is about 30 W shared between the first and second USB ports and the second amount of power is about 15 W shared between the first and second USB ports.

17. The combination receptacle of claim 14, further comprising:

a third USB port; and a shutter structured to have a first state to allow access to the third USB port and block access to the first and second USB ports and a second state to block access to the third USB port and allow access to the first and second USB ports, wherein the circuitry is structured to control and provide power to the third USB port.

18. The combination receptacle of claim 14, wherein the circuitry includes a power supply structured to convert utility power for use by the first and second USB ports.

19. The combination receptacle of claim 18, wherein the power supply is structured to provide up to 45 W of power for use by the first and second USB ports.

20. The combination receptacle of claim 19, wherein the power supply includes a flyback circuit.

21. The combination receptacle of claim 14, further comprising:

a power socket structured to receive a plug, wherein the receptacle is structured to receive utility power and provide utility power to the power socket.

* * * * *